(No Model.)

G. L. GRISWOLD.
JOURNAL BEARING.

No. 390,590. Patented Oct. 2, 1888.

WITNESSES:
Fred G. Dieterich

INVENTOR
Geo. L. Griswold
BY Munn & Co.
ATTORNEY

UNITED STATES PATENT OFFICE.

GEORGE L. GRISWOLD, OF BELLOWS FALLS, VERMONT.

JOURNAL-BEARING.

SPECIFICATION forming part of Letters Patent No. 390,590, dated October 2, 1888.

Application filed May 24, 1888. Serial No. 274,881. (No model.)

*To all whom it may concern:*

Be it known that I, GEORGE L. GRISWOLD, of Bellows Falls, in the county of Windham and State of Vermont, have invented a new and useful Improvement in Journal-Bearings, of which the following is a specification.

This invention pertains to certain improvements in journal-bearings which are adapted for lubricating flat equally as well as convex or cylindric surfaces, having for its object to promote and effect the thorough feeding of the lubricant or oil; and it consists of a bearing box or reservoir having a net-work of oil or lubricant passages or channels in it, at a number of the intersecting points of which are cavities or receptacles, substantially as hereinafter more fully set forth, and pointed out in the claims.

Figure 1:
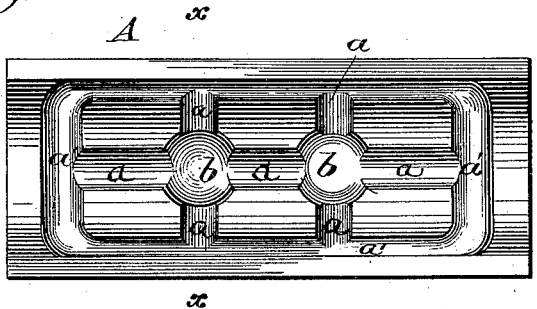
Figure 2:
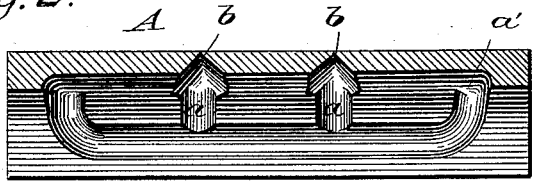
Figure 3:
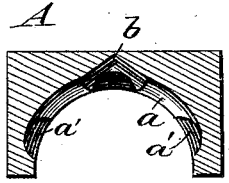

In the accompanying drawings, Figure 1 is an inverted plan of my improved lubricator. Fig. 2 is a longitudinal section, and Fig. 3 is a transverse section, of the same.

In carrying out my invention I provide a bearing-box, A, which is concaved upon its under side in order to accommodate it to the axle or journal upon which it is adjusted to lubricate the axle or journal. In the concaved surface of the box A is a net-work of oil passages or channels, which comprises a series of passages or channels, *a a*, intersecting and crossing each other preferably at right angles, while a continuous passage or channel, *a'*, surrounds and connects with the passages or channels *a a*. At the points of intersection of several of the passages or channels *a a* are cavities or receptacles *b b*, deeper somewhat than the said passages or channels, also holding oil or lubricant, for keeping up for a longer time than would otherwise be the case the supply of oil or lubricant to the passages or channels.

The lubricant, among other ways, may be first admitted to the reservoir thus formed by forming an aperture or passage through the reservoir or box A, communicating with the net-work of oil passages or channels.

It is obvious that, in lieu of forming the net-work of oil or lubricant passages or channels in a concaved surface, as in the present instance, the box or bearing may be flat upon its under side and the passages or channels be made therein, adapting the same for use upon a flat surface.

From the foregoing it will be seen that the oil or lubricant is thoroughly distributed over the surface of the axle or journal, while the supply or feeding thereof is prolonged or will hold out for a greater length of time than would otherwise be the case or by the ordinary method of feeding the lubricant.

Having thus described my invention, what I claim, and desire to secure by Letters Patent, is—

1. The lubricator consisting of a box or reservoir having in its face a net-work of oil passages or grooves, at the intersection of a number of which are cavities or cells, said net-work of grooves or channels communicating with and being surrounded by a continuous channel or passage, substantially as set forth.

2. The lubricator comprising a box or reservoir having in its friction or lubricating face a net-work of oil passages or grooves, at the intersection of a number of which are cavities, substantially as specified.

3. The lubricator consisting of a box or reservoir provided in its friction or lubricating face with a net-work of oil or lubricant passages or channels, at the intersection of a number of which are cavities somewhat deeper than said grooves or channels, substantially as set forth.

GEORGE L. GRISWOLD.

Witnesses:
    FRANCIS A. BOLLES,
    WILLIS H. GRISWOLD.